Oct. 18, 1927.
H. A. TUTTLE
1,646,127
REVERSING GEARING
Filed March 15, 1923     5 Sheets-Sheet 3
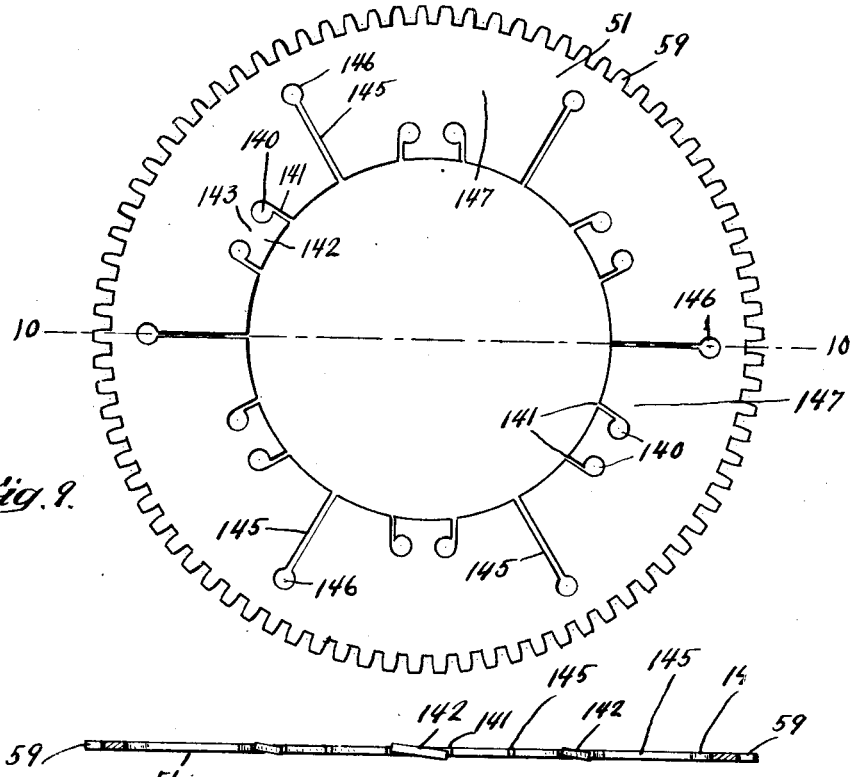
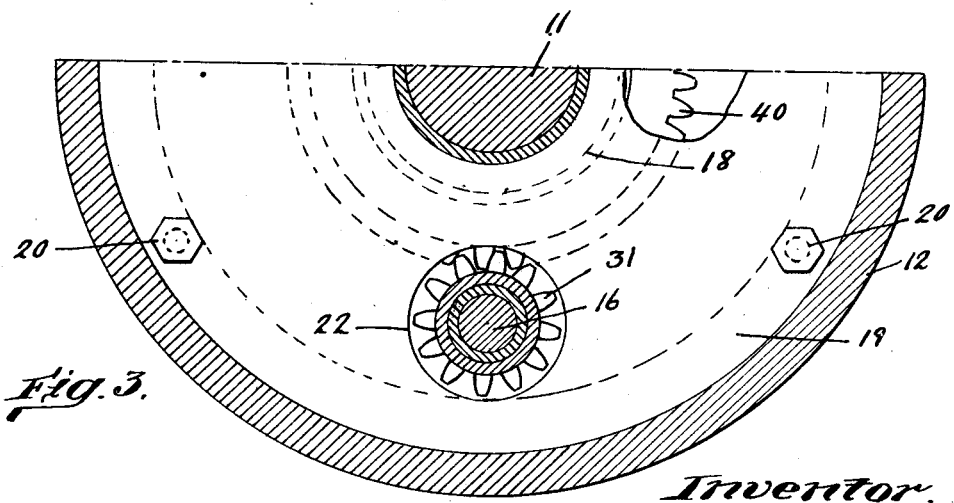
Inventor.
Henry A Tuttle

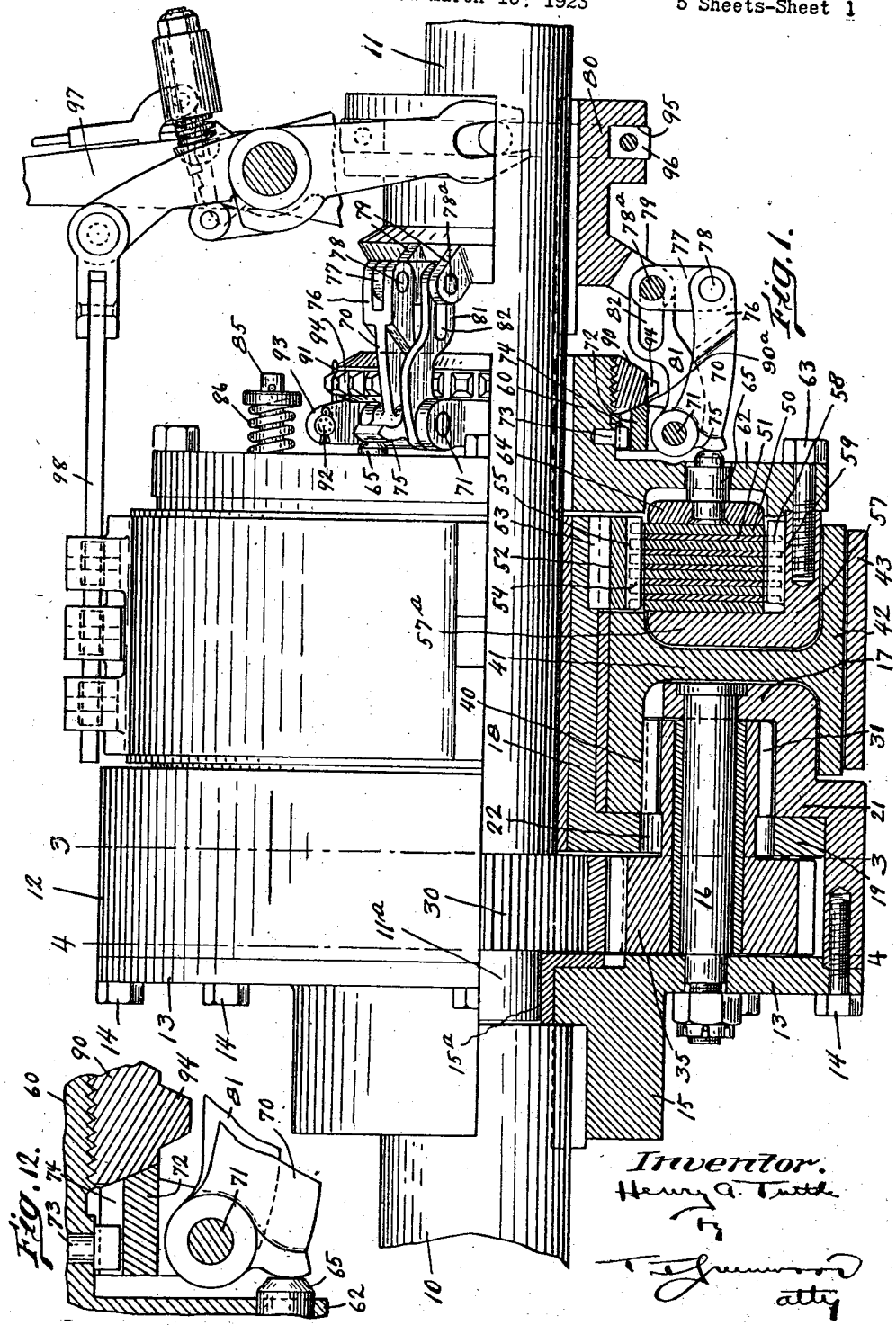

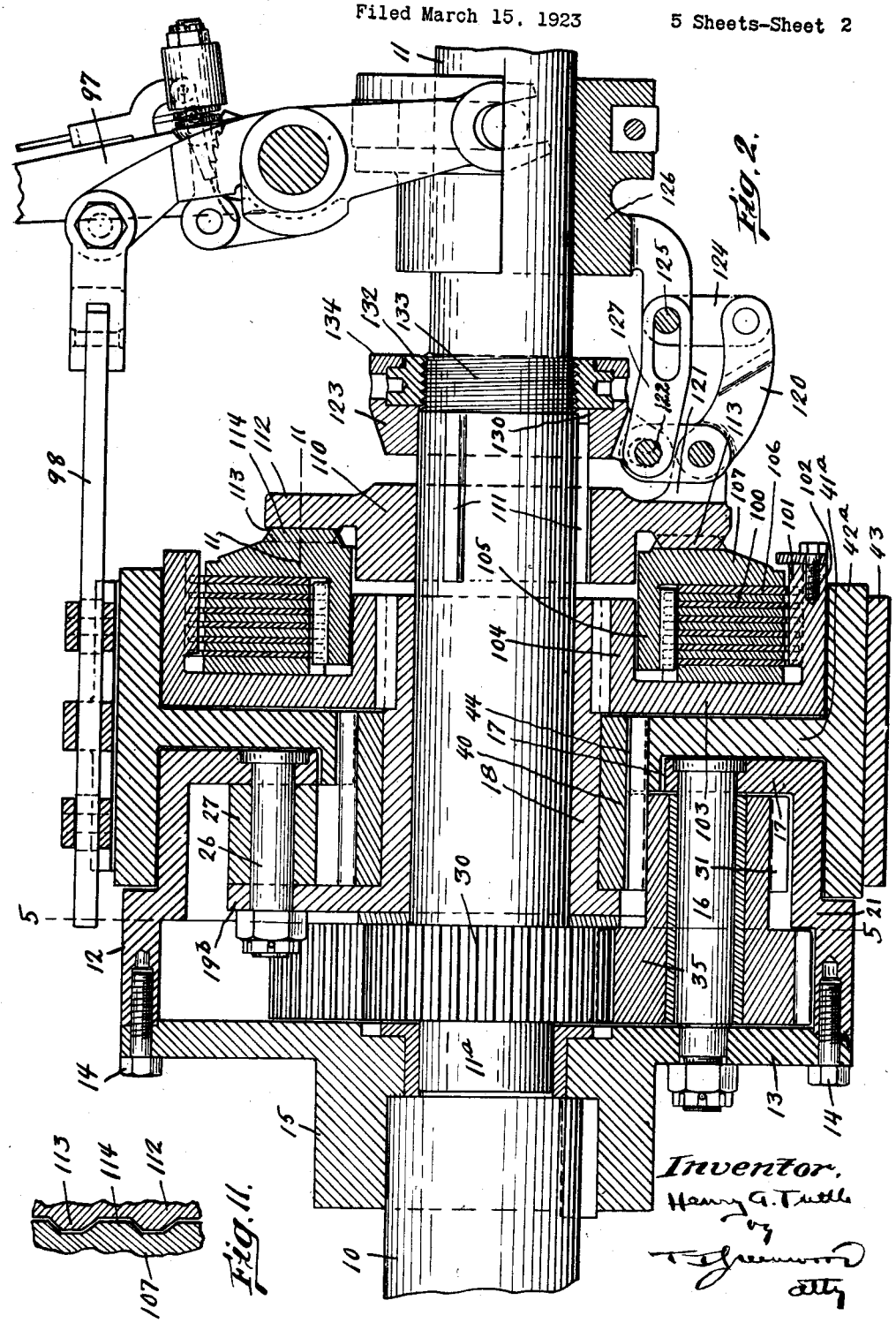

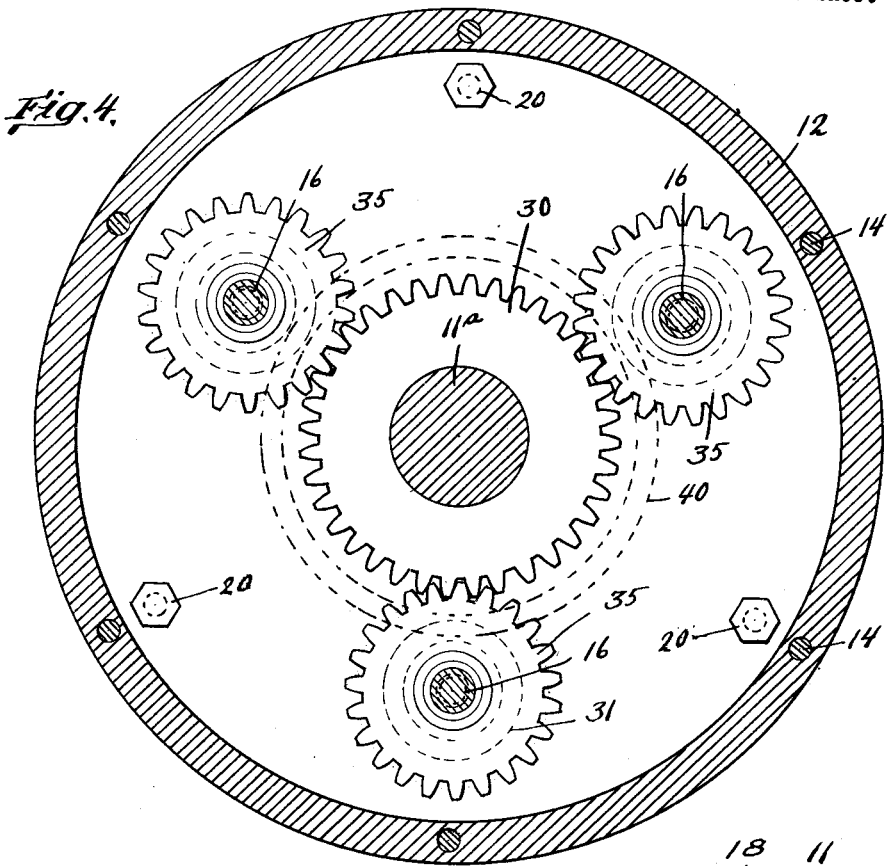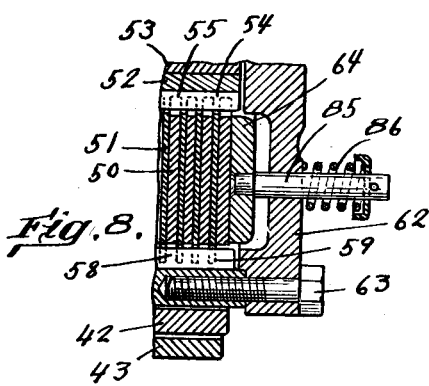

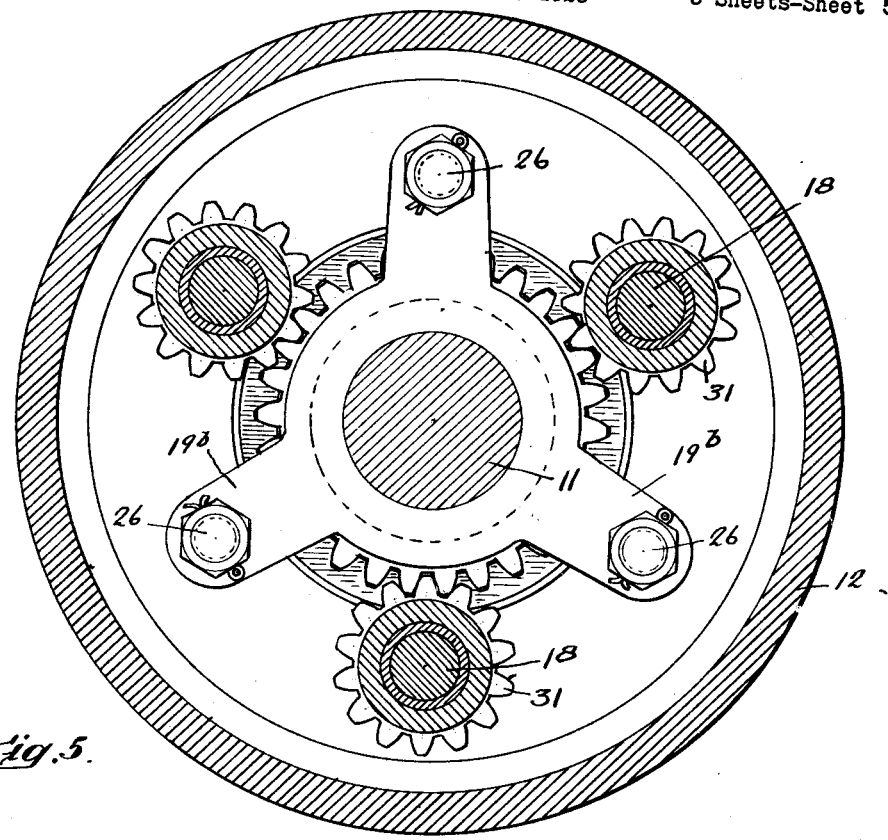
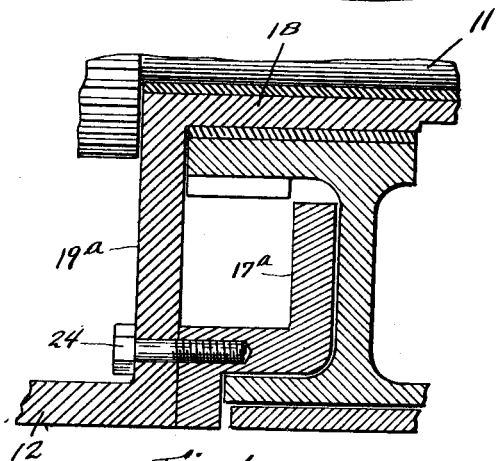

Patented Oct. 18, 1927.

1,646,127

UNITED STATES PATENT OFFICE.

HENRY A. TUTTLE, OF UPTON, MASSACHUSETTS.

REVERSING GEARING.

Application filed March 15, 1923. Serial No. 625,390.

This invention relates to reversing gearing of the type comprising a driving shaft, a driven shaft, gearing mechanism including planetary gearing elements adapted to connect said shafts for reverse drive and clutch mechanism adapted to connect said shafts for forward drive.

In reversing gearing of the type set forth, it has been customary to arrange the clutch mechanism so as to connect the planetary gearing elements to said driving and driven shafts against rotation independently thereof whereby to lock said gearing and thereby secure forward drive. With this arrangement, the drive is through the locked gearing elements, and the driving torque is transmitted through the teeth of the gears.

It is an object of this invention to provide a reversing gearing with clutching mechanism so arranged as to connect the driving and driven shafts directly for forward drive, and exclude the gearing elements. With this arrangement, the gearing elements are brought into effect to transmit the driving torque only when the reversing gearing is set for reverse drive.

In the usual type of reversing gearing it is customary to support certain of the gearing elements on a freely rotatable carrier and hold the carrier against rotation by suitable brake mechanism to secure reverse drive.

It is a further object of this invention to provide a gear carrier which is fixed to and adapted to rotate with one of said shafts, as the driving shaft, and a freely rotatable gear member arranged in driving connection with gearing elements carried by said carrier and means to restrain the gear member from rotation whereby to secure reverse drive.

The clutch mechanism in a reversing gearing may include a plurality of co-acting clutch plates, which are usually flat discs or rings. The clutch, so arranged, may have a tendency to remain in clutched condition when the actuating mechanism is operated to release the pressure on the clutch plates, due mainly to the viscosity of the lubricating oil film on the clutch plates.

It is a further object of this invention to provide the clutch mechanism with co-acting clutch plates some of which have self-contained spring elements which are arranged to act upon adjacent clutch plates whereby to effect the separation of the plates when the clutching pressure is relieved.

A yet further object is to provide a clutch plate with means to reduce its tendency to buckle or warp.

A further object is generally to improve the construction and operation of reversing gearing.

Certain features of this invention are described in my co-pending application Serial No. 625,389, filed March 15, 1923.

Fig. 1 is a sectional elevation through a reversing gearing embodying the invention.

Fig. 2 is a view similar to Fig. 1 showing a modified form of reversing gearing.

Fig. 3 is a section along line 3—3 of Fig. 1.

Fig. 4 is a section along line 4—4 of Fig. 1.

Fig. 5 is a section along line 5—5 of Fig. 2.

Figs. 6 and 7 are sectional details illustrating forms of casing constructions to be referred to.

Fig. 8 is a sectional detail of the clutch mechanism.

Fig. 9 is a front view of a clutch plate.

Fig. 10 is a section along line 10—10 of Fig. 9.

Fig. 11 is a developed sectional detail along line 11—11 of Fig. 2.

Fig. 12 is an enlarged sectional detail illustrating more particularly the curved formation of the thrust ring and pressure-adjusting member.

As here shown, the reversing gearing is adapted to connect the driving shaft 10 and driven shaft 11 for forward and reverse drive. In accordance with the invention, the reversing gearing may include a casing 12, also comprising a gear-cage or carrier, fixed to one of said shafts, as the driving shaft 10, and enclose and carry the planetary gearing elements. The casing may have various constructions for the purpose. In Fig. 1, the casing includes a plate 13 which forms an end wall of the casing and is or may be fixed thereto by the bolts 14. A hub 15 may be formed integrally and centrally with said plate 13 and have a recess therein in which the driving shaft is received and fixed, or the driving shaft and end plate, and consequently the casing, may be secured together for conjoint rotation in any other suitable manner. The casing may be formed or provided with an inwardly extending flange or wall 17 which is spaced from the end wall or plate 13 and is adapted to support bolts or pins 16 on which pinion gears of the planetary gearing element are supported, which gears are or may be disposed in the space between said end walls 13 and 17. The casing is also formed or provided with a hub 18 in which the driven shaft 11 is rotatably received. Said hub is adapted to be, in effect, integral with the casing and rotate with it; and said hub is adapted to extend beyond the end wall 17 and form an extension of the driving shaft at the rear of the gearing elements. The extended end of said hub is adapted to carry elements of the clutch mechanism as will hereinafter be described. Said hub 18 may be secured to the casing in any suitable manner. In Fig. 1 said hub is formed or provided with an integral and radially outstanding flange 19 which is secured by suitable means, as the bolts 20, to an internal flange 21 of the casing, whereby to connect said hub fixedly to the casing. Fig. 7 illustrates this form of connection between the flange 19 and casing. Said flange is or may be formed with apertures 22 therethrough adapted to receive pinion gears of the planetary gearing element.

In Fig. 6, the casing is integrally formed with the inwardly directed end wall 19ᵃ, and the hub 18 is integral with said end wall and casing. In this instance, the flange or wall 17ᵃ, corresponding to the flange or wall 17 of Fig. 1, is a separate member and is bolted or otherwise secured fixedly to the casing in any suitable manner, as by the bolts 24. In Fig. 2 the hub 18 is integrally or otherwise formed with the radially outwardly extended arms 19ᵇ which are the equivalent of the flange 19 of Fig. 1. Said arms are or may be secured fixedly to the end wall 17 of the casing by the bolts 26; and the spacers 27 disposed on said bolts between the arms and end wall serve to maintain the arms in spaced relation with the end wall and provide a space therebetween in which pinion gears of the planetary gearing element are adapted to be received.

A spur gear 30 is fixed to the driven shaft 11 and disposed in said casing between the inner end of the hub 18 and the end plate of the casing. The end portion 11ᵃ of said driven shaft may be reduced in diameter and be rotatably received in a bearing 15ᵃ of the hub 15 of said end plate 13. Said spur gear is adapted to mesh with pinion gears carried by the casing and be driven thereby when the reversing gearing is set for reverse drive.

Said pinion gears are or may be rotatably supported on said pins 16 which are extended between and carried by the end walls 13 and 17 of the casing. Preferably three sets of pinion gears are provided, as are here shown, although the exact number of sets is a matter of choice.

The pinion gears may comprise the large pinion gears 35 which are adapted to mesh with and drive the spur gear 30 and the small pinion gears 31 which are arranged beside said large pinion gears and are integrally connected therewith, or they may be otherwise connected whereby to rotate together. Said small pinion gears are or may be contained in that portion of the casing between the end wall 17 and the flange 19, or equivalent, of the hub 18.

The arrangement of pinion gears of different diameters provides means to obtain a reverse speed of rotation of the driven shaft which may be any desired amount by properly selecting the diameter of the various gears.

The gears 35 and 31 and the casing 12 constitute a planetary gearing element by which the driven shaft may be driven in a direction reversed from the direction of rotation of the driving shaft. It will be noted that when said casing 12 is rotated with the small gears 31 arranged in driving engagement with a fixedly supported spur gear, said gears and casing will drive the driven shaft, through the spur gear 30 fixed to said shaft, in the reverse direction.

For this purpose, a spur gear 40 is rotatably supported on suitable supporting means as the hub 18 of the casing and arranged in mesh with the small pinion gears 31 and means are or may be provided to hold said spur gear against rotation, whereby to condition the gearing for reverse drive, or release said gear for rotation, whereby to place the gearing in neutral condition, in which condition the driven shaft is free from positive driving connection with the driving shaft, or to permit the clutch mechanism to be operated for direct drive.

Various means may be provided by which said gear 40 may be held from rotation and released for rotation. In Fig. 1, said gear is or may be formed with an integral flange 41 which extends outwardly beside the end-wall 17 of the casing and terminates in the drum 42 which is adapted to be engaged by a stationarily supported brake band 43 or equivalent means whereby to restrain said gear 40 from rotation. In Fig. 2, the drum 42ᵃ corresponding to the drum 42 is formed with the inwardly directed flange 41ᵃ, corresponding to the flange 41. Said flange 41ᵃ is or may be formed with teeth 44 which may be of internal gear-tooth formation and which engage and mesh with the teeth of the spur gear 40, whereby to connect said drum and gear fixedly against independent rotation. It is clear that when said brake band 43 is contracted into engagement with said drum 42, said gear 40 is held fixed and the pinion gears 31 may be rotated by said gear as the casing is revolved, whereby to effect the reverse rotation of the driven shaft.

The clutch mechanism, by which forward drive may be secured, is disposed at the rear end of the casing 12 and may comprise a set of clutch plates 50 carried by the extended end of the hub 18 of the casing and a co-acting set of clutch plates 51 carried by the driven shaft 11. Said clutch plates 50 may be secured directly in connection with said hub 18 or they may be carried by the ring 52, as shown in Fig. 1, and said ring may be fixed to said hub in any suitable manner, as by the key 53. The connection between said ring 52 and the clutch plates 50 may include spur gear teeth 54 formed on the periphery of said ring. Said clutch plates 50 may be formed or provided with teeth 55 which may be of internal gear tooth formation and which are adapted to mesh and be axially movable in engagement with the spur gear teeth of said ring 52. The set of clutch plates 51 may be carried by a carrier 57 which may be disposed within the drum 42. Said carrier may be provided on its inner face with teeth 58 which may have an internal gear tooth formation and said clutch plates 51 may have teeth 59 on the outer periphery thereof which have external or spur gear tooth formation; and the teeth of said clutch plates 51 are adapted to mesh with and be slidable axially while in driving contact with the teeth of said carrier.

The clutch plates are adapted to be moved axially into clutching engagement and said carrier may have the inwardly directed wall 57ª adapted to support the clutch plates against the clutch-engaging pressure. Said carrier 57 is or may be fixed to the driven shaft by suitable means which may include the hub 60 which latter is or may be fixed to the driven shaft against both axial and rotary movement independently thereof. Said hub may be formed or provided with an outwardly directed flange 62, and the clutch plate carrier may be fixedly secured thereto by suitable means, as the bolts 63. The clutch mechanism may include a pressure plate in the form of a ring 64 which is disposed at the rear end of the sets of clutch plates and is adapted to be moved forwardly to effect the clutching engagement of the clutch plates. Said ring may be formed or provided with pins 65 which are slidably received in apertures in the flange 62 and are extended rearwardly beyond said flange for engagement with the clutch actuating mechanism.

It is seen that when said pressure ring 64 is forced forward, the clutch plates will be caused to engage and will connect the hub 18 to the driven shaft and, inasmuch as said hub 18 is fixed to and serves as an extension of the driving shaft, the arrangement is such that the driven shaft is connected directly to the driving shaft for forward drive, and the gearing elements are excluded from the driving connections.

The clutch actuating mechanism illustrated in Fig. 1 includes a plurality of levers 70 which are pivoted at 71 to a thrust ring 72 which latter encircles said hub 60 and is or may be connected for axial movement therewith but against rotation independently thereof by suitable means as the key 73 which is loosely received in the groove 74 of said ring. Said levers 70 are or may be formed with the cam faces 75 which are adapted to engage and bear against the exposed ends of said pins 65, whereby to actuate the clutch. Said levers are or may be provided with bifurcated end portions 76, and links 77 may be received between and pivoted to said furcations by means of the pins 78. The inner ends of said links 77 are or may be pivoted on pins 78ª which are carried by ears 79 of a thrust sleeve 80. Links 81 may be pivoted to said pins 71 of said thrust ring 72 and said links may be provided with elongated slots 82 in which the pins 78ª carried by said thrust sleeve 80 are received. The ears 79 of said thrust sleeve and said links 77 cooperate to form toggle members by which the clutch is actuated and said slotted links 81 form stop members adapted to restrict the movement of said thrust sleeve and the movement of said toggle member beyond substantially on-center and clutch-set position.

When the clutch is released, upon movement of the thrust sleeve 80 inwardly, the levers 70 may become free from the pins 65 of the pressure ring 64 and the clutch plates may separate by their inherent resiliency, or the clutch plates may be so formed and arranged as to ensure the separation thereof, as will be hereinafter described. Means may be provided to ensure the movement of the pressure ring from forcible engagement with the clutch plates. Said means may comprise pins 85, see Fig. 8, which are carried by said pressure ring and which extend slidably through apertures in the flange 62 of the clutch casing and bear compression springs 86 at their outer ends which serve to retract said pressure ring when the clutch-engaging pressure on said ring is removed. Said pins 85 may serve also as guiding and supporting means for said pressure ring.

Means are or may be provided to form an abutment adapted to support the thrust ring 72 against the clutch engaging pressure and also to adjust said ring axially on said hub 60, whereby to vary the clutch engaging pressure and compensate for wear between the clutch plates and in the clutch actuating mechanism. Said means may comprise the internally screw-threaded pressure-adjusting ring 90 which is or may be adjustably received on the externally screw-threaded portion of the hub 60. Said thrust ring 72 is adapted to bear against and be supported against axial movement to the right, Fig. 1, by said ring. Said pressure-adjusting ring 90 is preferably provided with a spherically-shaped inner face 90ª and said thrust ring 72 is preferably formed with a complementary shaped engaging face. Said ring 90 is adapted to be adjusted axially by a rotary movement thereof on said hub whereby to vary the clutch engaging pressure in a manner that may be readily understood.

It is to be noted that, by reason of the complementary spherically-shaped faces on said rings 72 and 90, provision is made for the automatic adjustment and balance of the clutching pressure of said links 70 for the reason that, if a link 70 should exert an increased and thereby unbalanced pressure on its pin 65, said ring 72 will be moved laterally on its spherical seat on said ring 90 whereby to decrease the leverage of the other links 70 on their respective pins and equalize the pressure.

Means may be provided to lock said ring 90 in adjusted position and said means may include a spring-pressed latch 91 which is or may be pivotally supported on the pin 92, which latter may be carried by the ears 93 extended from the periphery of the thrust ring 72. Said latch is adapted to be spring-pressed removably into notches 94 which are formed in the periphery of said adjusting ring 90 whereby to lock said ring removably into fixed position relative to the thrust ring 72.

The clutch actuating mechanism herewith described is also described in my above named co-pending application.

Said thrust sleeve 80 may be formed with an annular groove 95 in which a ring 96 is or may be loosely received and a pivoted operating handle 97 may be connected with said ring whereby to move said thrust sleeve axially and set the reversing gearing for forward drive.

Brake actuating mechanism for reverse drive may include the bar 98 which may be connected with the operating handle in any suitable manner not shown in Fig. 1. Said bar 98 may have slidable cam engagement with the ends of the brake band in a more or less usual manner whereby a movement of said bar in one direction, as toward the right, Fig. 1, serves to contract the band about the drum 42 and set the gearing for reverse drive, and a movement in the opposite direction serves to expand the brake band and cause the gearing elements to be inoperative. In the mid-position of the operating handle both reverse and forward drive mechanisms are adapted to be disengaged and the gearing may be in neutral condition with the driven shaft free from positive connection with the driving shaft.

Fig. 2 illustrates a modified form of clutch mechanism. The driving clutch plates 100 are or may be carried by and in driving engagement with internal gear teeth 101 of a clutch plate carrier 102 and said carrier is or may be formed with the wall 103 and the hub 104 and by which latter the carrier is fixed to and driven by the hub 18, of the casing 12. A second carrier 105, for the driven set of clutch plates 106, is or may be received within the first carrier and is or may be rotatably supported on the hub 104 of said first carrier. Said second carrier may be formed with spur gear teeth with which the clutch plates 106 are in sliding engagement. Said carrier 105 is or may be provided with an outstanding flange 107 which is adapted to serve as a pressure member between which and the wall 103 of the first carrier the clutch plates are adapted to be compressed, whereby to actuate the clutch.

The clutch actuating mechanism includes means automatically to compensate for wear between the clutch plates and increase the clutch engaging pressure if and when there is a relative slipping between the two sets of clutch plates; and said means is or may be essentially the same as described in my patent No. 1,392,984, issued October 11, 1921. Said means may include a hub 110 which is slidable on the driven shaft 11 but fixed against rotary movement thereon by suitable means as the keys 111. Said hub is formed with a flange 112 which may be provided with a plurality of wedge-shaped teeth 113, more clearly illustrated in Fig. 12. The flange 107 of the carrier 105 is or may be formed with similarly shaped teeth 114 which are adapted to enter the interdental spaces between and engage the teeth 113, see Fig. 11. The clutch engaging pressure is adapted to be transmitted through the teeth 113 and 114 and, if slipping tends to take place between the clutch plates, the teeth 114 tend to ride on the inclined faces of the teeth 113 whereby an increased pressure will be exerted on the clutch plates and prevent further slipping therebetween. When the clutch is in operated position, the teeth 113 and 114 are adapted to be entirely disengaged and the carrier may rotate freely.

The arrangement of clutch mechanism illustrated in Fig. 2 is such that, in reverse drive and neutral conditions of the gearing, the clutch plate carrier 105 and the set of clutch plates carried thereby is free from positive driving engagement with any rotating component of the gearing, whereby the dragging effect between the clutch plates in reverse drive and neutral is obviated.

The actuating mechanism for said hub 110 may include the bell-crank levers 120 which are pivotally connected to ears 121 extended rearwardly from the flange 112 of said hub. The short arms of said bell-crank levers are pivoted on pins 122 carried by the thrust ring 123. The long arms of said levers are or may be bifurcated and links 124 may be pivotally connected thereto. The inner ends of said links may be pivoted on pins 125 carried by the thrust sleeve 126, which latter is slidably and rotatably supported by the driven shaft 11. Limit links 127 may connect said thrust ring and thrust sleeve in a manner similar to that described in connection with the links 81 of Fig. 1.

Said thrust ring 123 is or may be free for axial movement on the driven shaft 11 but is fixed against rotation thereon and the means for effecting this result may include slots 130 in said ring in which said keys 111 are loosely received. Said thrust ring 123 is adapted to be supported against the thrust thereon in the clutch actuating operation by the pressure-adjusting ring 132 which latter is or may be adjustably screw-threaded on the externally screw-threaded portion 133 of the driven shaft. Said ring 132 is adapted to be received between the thrust ring and a lock ring 134 and when said thrust and lock rings are clamped together in any suitable manner with the adjusting ring 132 therebetween, said adjusting ring is held fast in adjusted position.

In a reversing gearing having clutch mechanism including clutch plates to secure forward drive there is a tendency for the clutch plates to adhere together, even when the pressure thereon is released, due mainly to the viscosity of the film of lubricating oil on the contacting surfaces of the plates. The adherency of the clutch plates is undesirable, especially with the form of clutch mechanism illustrated in Fig. 1, as it may result in a drag between the plates and a consequent loss of power and also a lack of positive disconnection between the driving and driven shafts.

A further object of this invention is to provide a reversing gearing having clutch plates formed with resilient elements arranged to bear against adjacent clutch plates and act effectively to move said plates axially and separate them when the clutch engaging pressure is released, although said elements are adapted to yield readily to the clutching pressure whereby to permit the effective engagement of the clutch plates.

The usual type of clutch plate, comprising a flat disc or ring, has a tendency to buckle in use, due mainly to the flow or displacement of metal in the disc under the clutching pressure and the driving torque, and the invention further contemplates means to reduce the buckling effect. Figs. 9 and 10 illustrate a clutch plate arranged in accordance with these features of the invention. While clutch plates of both co-acting sets may be arranged to provide the results above set forth, said Figs. 9 and 10 illustrate a clutch plate 51 adapted to be supported and driven at its outer periphery and for this purpose has the external gear teeth 59 formed in its outer edge. The clutch plate here illustrated is one of the clutch plates contained in the gearing illustrated in Fig. 1, although it may well be a clutch plate 100 illustrated in Fig. 2. For the purpose of providing the clutch plate with self-contained spring elements, the clutch plate is or may be formed with the pairs of relatively closely spaced and preferably circular apertures 140 within the boundaries of and adjacent the inner periphery and slots 141 extended from the remote edges of said apertures 140 to the inner periphery. This arrangement provides teeth 142 having undercut flank portions 143. Said teeth are twisted or are given a permanent set angularly to the plane of the clutch plate as illustrated in Fig. 10 whereby edge portions of said teeth are caused to project laterally on opposite sides of said plate. When clutch plates thus formed are arranged in sets as illustrated in Fig. 1, for instance, said resilient teeth engage and force the adjacent clutch plates axially to assume a position wherein the clutch plates are clear of each other when the clutch-engaging pressure is not applied. Only the clutch plates of one set need be thus arranged. When the clutch-engaging pressure is applied to the clutch plates, the teeth 142 are adapted to yield and flex inwardly into substantial parallelism with the body of the plate and permit the clutch plates to become effectively engaged.

As above stated, with use, the usual solid clutch plate may buckle due to a flow or displacement of metal therein under the driving torque, and the clutch plate 51 is provided with means to reduce said buckling. For this purpose, the clutch plate 51 may be formed with a plurality of slots 145 of substantial width therethrough and said slots may extend from the inner periphery of the clutch plate to a point adjacent its outer periphery and terminate preferably in circularly formed apertures 146 whereby to separate the clutch plate into a plurality of sections 147 connected only at their outer peripheries. Said slots may extend substantially across the contact faces of the clutch plate. Preferably the clutch plate is provided with a plurality of such sections each of which is or may be of relatively small angular extent. As thus arranged, while the driving torque may cause a displacement of metal in a circular path in said sections 147, the metal will be forced into said slots 145 and said slots are adapted to be of substantial width whereby to receive this metal without becoming filled.

Due to the relatively small angular extent of the section, the displacement of metal in each section has no appreciable effect in distorting the sections.

Clutch plates arranged to be supported and driven at the inner periphery thereof may also be arranged as above set forth.

The constructions here shown may be otherwise modified without departing from the spirit of the invention.

I claim:

1. Reversing gearing comprising the combination of a driving shaft, a driven shaft, gearing mechanism adapted to connect said shafts for reverse drive including a casing fixed to said driving shaft, a gear fixed to said driven shaft, gears carried by said casing some of which mesh with the gear of said driven shaft, a control gear rotatable on said casing and meshing with some of said casing gears, means to hold said control gear stationary for reverse drive, and clutch mechanism arranged to connect said shafts directly and exclude the gearing mechanism for forward drive.

2. Reversing gearing comprising the combination of a driving shaft, a driven shaft, gearing mechanism adapted to connect said shafts for reverse drive including a casing fixed to said driving shaft, a gear fixed to said driven shaft, gears carried by said casing some of which mesh with the gear of said driven shaft, a control gear rotatable on said casing and meshing with some of said casing gears, means to hold said control gear stationary for reverse drive, and clutch mechanism arranged to connect said shafts directly and exclude the gearing mechanism for forward drive comprising means to connect said casing in driving relation with said driven shaft.

3. Reversing gearing comprising the combination of aligned and contiguous driving and driven shafts, gearing mechanism adapted to connect said shafts for reverse drive including a casing fixed to said driving shaft and extended over and rotatably supported on said driven shaft, and clutch mechanism adapted to connect said shafts directly and exclude said gearing mechanism including co-acting clutch members carried by said casing and driven shaft and disposed about said driven shaft.

4. Reversing gearing comprising the combination of aligned and contiguous driving and driven shafts, gearing mechanism adapted to connect said shafts for reverse drive including a casing fixed to said driving shaft extended over and rotatably supported on said driven shaft, and clutch mechanism adapted to connect said shafts directly and exclude said gearing mechanism including co-acting clutch members driven by said driving and driven shafts.

5. Reversing gearing comprising the combination of a driving shaft, a driven shaft, gearing adapted to connect said shafts for reverse drive comprising a gear fixed to the driven shaft, planetary gearing elements carried by and rotatable with the driving shaft including pinion gears meshing with the gear on said driven shaft, actuating mechanism for said gearing mechanism including a rotatably supported gear element associated with said planetary gearing elements, means to hold said gear element fixed against rotation, clutch mechanism arranged to connect said shafts directly and exclude said gearing for forward drive, and means extended through said gear element connecting said clutch mechanism with said driving shaft.

6. Gearing mechanism comprising the combination of a driving shaft, a driven shaft, a gear fixed to said driven shaft, a gear-carrier fixed to said driving shaft, planetary gearing elements carried by said carrier including rotatably supported pinion gears meshing with the gear of said driven shaft, means including a normally free control gear rotatable on said gear-carrier and disposed within and meshing with said gearing elements to drive said driven shaft reversely, and clutch mechanism arranged to connect said shafts directly and exclude said gearing for forward drive.

7. Gearing mechanism comprising the combination of a driving shaft, a driven shaft, a casing carried by said shafts and fixed to said driving shaft, a gear fixed to said driven shaft, planetary gearing elements carried by said casing in mesh with said gear, a control gear loosely mounted on said casing in mesh with said gearing elements, a brake drum connected with said control gear to hold it against rotation for reverse drive, clutch plates fixed to said casing and disposed beside said control gear, and co-operating clutch plates connected with said driven shaft.

8. Reversing gearing comprising the combination of a driving shaft, a driven shaft, gearing mechanism adapted to connect said shafts for reverse drive comprising a casing fixed to and rotatable with said driving shaft a spur gear fixed to said driven shaft, a spur gear rotatably supported by said casing, rotatable pinion gears carried by said casing adapted to be revolved about and in engagement with said spur gears, brake mechanism arranged to hold said rotatably supported gear fixed against rotation, and clutch mechanism arranged to connect said shafts directly for forward drive and exclude said gearing, comprising co-acting clutch members carried and driven directly by said casing and driven shaft.

9. Reversing gearing comprising the combination of a driving shaft, a driven shaft, gearing mechanism adapted to connect said shafts for reverse drive comprising a casing fixed to and rotatable with said driving shaft having an extension in which said driven shaft is rotatable, a spur gear fixed to said driven shaft, a spur gear rotatably supported on said casing extension, pinion gears rotatably supported in said casing and adapted to be revolved about and in engagement with said spur gears, brake mechanism arranged to hold said rotatably supported spur gear fixed against rotation, and clutch mechanism adapted to connect said shafts directly for forward drive and exclude said gearing comprising co-acting clutch members carried and driven directly by said casing-extension and driven shaft.

10. Reversing gearing comprising the combination of a driving shaft, a driven shaft, gearing mechanism adapted to connect said shafts for reverse drive comprising a casing fixed to and rotatable with said driving shaft having an extension in which said driven shaft is rotatable, a spur gear fixed to said driven shaft, a spur gear rotatably supported on said casing extension, pinion gears rotatably supported in said casing and adapted to be revolved about and in engagement with said spur gears, said rotatably supported spur gear having an annular drum, and brake mechanism arranged to engage said drum hold said gear against rotation, and clutch mechanism adapted to connect said shafts directly for forward drive and exclude said gearing comprising co-acting clutch members carried and driven directly by said casing-extension and driven shaft.

11. Reversing gearing comprising the combination of a driving casing, a driven shaft, said casing having two compartments and an extension in which said driven shaft is rotatably supported, a spur gear arranged in one of said compartments and fixed to said driven shaft, a spur gear disposed in and extended beyond said other compartment and rotatably supported on said casing extension, said latter gear having an annular brake drum, pinion gears rotatably supported by said casing and adapted to be revolved about and in engagement with said spur gears, brake mechanism adapted to engage said drum to hold said rotatably supported gear against rotation and set the gearing for reverse drive, and clutch mechanism adapted to connect said casing and driven shaft directly for forward drive and exclude said gearing comprising co-acting clutch members carried and driven directly by said casing-extension and driven shaft.

12. Reversing gearing comprising the combination of a driving casing, a driven shaft, said casing having two compartments and an extension in which said driven shaft is rotatably supported, a spur gear arranged in one of said compartments and fixed to said driven shaft, a spur gear disposed in and extended beyond said other compartment and rotatably supported on said casing-extension, said latter gear having an annular brake drum, large and small connected pinion gears disposed in said casing compartments and rotatably supported by said casing and adapted to be revolved about and in engagement with said driven shaft gear and rotatably supported gear respectively, said rotatably supported gear having a brake drum, a brake mechanism adapted to engage said brake drum and hold said rotatably supported gear against rotation, whereby to set the gearing for reverse drive, and clutch mechanism adapted to connect said shafts directly for forward drive and exclude said gearing comprising co-acting clutch-members carried and driven directly by said casing-extension and driven shaft.

13. Reversing gearing comprising the combination of a driving casing, a driven shaft, said casing having an extension in which said driven shaft is rotatable, a spur gear disposed in said casing and fixed to said driven shaft, a spur gear rotatably supported on said casing-extension, pinion gears rotatably supported by said casing and adapted to be revolved about and engage said spur gears, said rotatably supported spur gear having a brake drum carried by it, and brake mechanism adapted to engage said brake drum and hold said gear against rotation, whereby to set the gearing for reverse drive, and clutch mechanism adapted to connect said driving casing and driven shaft for forward drive comprising a clutch casing fixed to said driven shaft, clutch plates disposed within and driven by said casing, and co-acting clutch plates also disposed within said casing and driven by the extension of said driving casing.

14. Reversing gearing comprising the combination of a driving casing, a driven shaft, said casing having an extension in which said driven shaft is rotatable, a spur gear disposed in said casing and fixed to said driven shaft, a spur gear rotatably supported on said casing-extension, pinion gears rotatably supported by said casing and adapted to be revolved about and engage said spur gears, said rotatably supported spur gear having a brake drum carried by it, and brake mechanism adapted to engage said brake drum and hold said gear against rotation, whereby to set the gearing for reverse drive, and clutch mechanism adapted to connect said driving casing and driven shaft for forward drive comprising a clutch casing fixed to said driven shaft and disposed within said brake drum, clutch plates disposed within and driven by said casing, and co-acting clutch plates also disposed within said casing and driven by the extension of said driving casing.

15. Reversing gearing comprising the combination of a driving shaft, a driven shaft, a gear casing fixed to said driving shaft having gear elements adapted to connect said shafts for reverse drive, a brake drum rotatably supported on an extension of the casing having operative connection with said gearing elements, brake mechanism adapted to hold said brake drum against rotation to set the gearing for reverse drive, and clutch mechanism adapted to connect said shafts for forward drive comprising co-acting clutch-members carried and driven by said gear casing extension and driven shaft.

16. Reversing gearing comprising the combination of a driving shaft, a driven shaft, a gear casing fixed to said driving shaft having gear elements adapted to connect said shafts for reverse drive, a brake drum rotatably supported beside and on an extension of said casing having operative connection with said gearing elements, brake mechanism adapted to hold said brake drum against rotation to set the gearing for reverse drive, and clutch mechanism disposed beside said brake drum having co-acting clutch-members carried and driven by said casing-extension and driven shaft adapted to connect said driving and driven shafts for forward drive.

17. Reversing gearing comprising the combination of a driving casing, gear elements carried by said casing, a driven shaft arranged to be driven by said gearing elements, a brake drum operatively connected with said gearing elements and having a rotatable support on said casing, brake mechanism adapted to hold said brake drum against rotation whereby to set the gearing for reverse drive, and clutch mechanism including co-acting clutch members driven by said driving casing and driven shaft adapted to connect said casing and shaft for forward drive.

18. Reversing gearing comprising the combination of a driving shaft, a casing fixed to and rotatable with said driving shaft, said casing having an extension in which said driven shaft is rotatable, a spur gear fixed to said driven shaft, a spur gear rotatably supported by said casing-extension and extended outwardly beyond said casing and having spur gear teeth on its extended portion, a brake drum carried by said gear and having internal gear teeth which mesh with the spur gear teeth of said gear, pinion gears rotatably carried by said casing adapted to be revolved about and engage said spur gears, brake mechanism adapted to hold said brake drum against rotation whereby to set the gearing for reverse drive, and clutch mechanism arranged to connect said driving and driven shafts directly and exclude said gears for forward drive.

19. Reversing gearing comprising the combination of a driving casing having end walls and a hub having an annular outstanding flange connected with the casing and arranged to separate it into front and rear compartments, said hub extended outwardly beyond said rear compartment, a driven shaft rotatably supported by said hub, a spur gear fixed to said driven shaft and disposed in said front casing compartment, a spur gear rotatably supported on said hub and disposed in and extended beyond said rear casing compartment, pinion gears rotatably supported by said casing and disposed in both casing compartments and adapted to be revolved about and engage said spur gears, said rotatably supported spur gear having an exposed brake drum, brake mechanism adapted to hold said brake drum and gear from rotation, whereby to set the gearing for reverse drive, and clutch mechanism comprising co-acting clutch members carried and driven by said hub and driven shaft arranged to connect said casing and shaft for forward drive.

20. Reversing gearing comprising the combination of a driving casing having a hub, a driven shaft rotatable in said hub and having a gear fixed thereto, gearing elements carried by said casing arranged to drive said shaft gear, brake mechanism including a rotatable brake drum operatively associated with said gearing arranged to be held against rotation to set the gearing for reverse drive, and clutch mechanism adapted to connect said casing and shafts for forward drive comprising a set of clutch plates carried by and movable axially on the hub of said casing, a clutch-plate carrier fixed to said driven shaft, and a set of co-acting clutch plates carried by and axially movable on said carrier.

21. Reversing gearing comprising the combination of a driving casing having a hub, a driven shaft rotatable in said hub and having a gear fixed thereto, gearing elements carried by said casing arranged to drive said shaft gear, brake mechanism including a rotatable brake drum operatively associated with said gearing arranged to be held against rotation to set the gearing for reverse drive, and clutch mechanism adapted to connect said casing and shaft for forward drive comprising a set of clutch plate carriers carried by the hub of said casing, a clutch plate fixed to said driven shaft, a set of co-acting clutch-plates carried by said carrier, said carrier having an externally screw-threaded hub, a pressure adjusting ring screw-threaded on said hub, a thrust ring encircling said hub and adapted to bear against said pressure-adjusting ring, and link and lever mechanism pivoted to said thrust ring having operative connection with said clutch plates.

22. Reversing gearing comprising the combination of a driving shaft, a driven shaft, a casing supported on one of said shafts having gearing elements contained therein adapted to connect said shafts for reverse drive, a casing disposed beside said gearing casing having clutch mechanism enclosed therein adapted to connect said shafts for forward drive, and actuating mechanism for said gearing elements including a brake drum disposed between said two casings and at least partially enclosing both casings.

In testimony whereof, I have signed my name to this specification.

HENRY A. TUTTLE.